United States Patent
Bauer et al.

(10) Patent No.: US 12,231,472 B2
(45) Date of Patent: *Feb. 18, 2025

(54) SHARED AUGMENTED REALITY SESSION CREATION

(71) Applicant: Snap Inc., Santa Monica, CA (US)

(72) Inventors: Kristian Bauer, West Boylston, MA (US); Tiago Rafael Duarte, Marina Del Rey, CA (US); Terek Judi, Long Beach, CA (US); Shin Hwun Kang, Los Angeles, CA (US); Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,364

(22) Filed: Aug. 25, 2023

(65) Prior Publication Data

US 2023/0412650 A1 Dec. 21, 2023

Related U.S. Application Data

(63) Continuation of application No. 17/544,496, filed on Dec. 7, 2021, now Pat. No. 11,863,596.

(51) Int. Cl.
*G06F 13/00* (2006.01)
*G02B 27/01* (2006.01)
(Continued)

(52) U.S. Cl.
CPC ...... *H04L 65/1069* (2013.01); *G02B 27/0172* (2013.01); *G06F 3/1454* (2013.01);
(Continued)

(58) Field of Classification Search
CPC .............. H04L 65/1069; H04L 65/403; H04L 67/131; H04L 67/146; H04L 67/51;
(Continued)

(56) References Cited

U.S. PATENT DOCUMENTS

| 9,483,556 B1 | 11/2016 | Cohen et al. |
| 10,339,175 B2 | 7/2019 | Cohen et al. |

(Continued)

FOREIGN PATENT DOCUMENTS

| CN | 103760972 | 4/2014 |
| CN | 105874450 | 8/2016 |

(Continued)

OTHER PUBLICATIONS

"U.S. Appl. No. 17/544,496, Non Final Office Action mailed Nov. 10, 2022", 11 pgs.

(Continued)

*Primary Examiner* — Kenneth R Coulter
(74) *Attorney, Agent, or Firm* — Schwegman Lundberg & Woessner, P.A.

(57) ABSTRACT

A head-worn device system includes one or more cameras, one or more display devices and one or more processors. The system also includes a memory storing instructions that, when executed by the one or more processors, configure the system to perform operations to initiate or join a joint visual computing session. The method may comprise receiving user input to initiate a joint session of a visual computing experience, monitoring for short-range data transmissions including data indicating the existence of a current session of the visual computing experience, and based on determining that a current session is in progress, providing a user input option to join the current session of the visual computing experience.

20 Claims, 9 Drawing Sheets

(51) Int. Cl.
*G06F 3/14* (2006.01)
*H04L 65/1069* (2022.01)

(52) U.S. Cl.
CPC ............... *G02B 2027/0138* (2013.01); *G02B 2027/0178* (2013.01)

(58) Field of Classification Search
CPC ............ H04L 65/1093; G02B 27/0172; G02B 2027/0138; G02B 2027/0178; G06F 3/1454; G06F 3/011; G06F 3/012; H04W 4/80
USPC ............... 709/227, 228, 204, 205, 224, 201, 709/220–222; 718/1, 100
See application file for complete search history.

(56) References Cited

U.S. PATENT DOCUMENTS

| | | | |
|---|---|---|---|
| 10,581,940 B1 * | 3/2020 | Iyer | H04B 17/318 |
| 10,852,838 B2 | 12/2020 | Bradski et al. | |
| 11,050,803 B2 * | 6/2021 | Iyer | H04L 65/1069 |
| 11,800,059 B2 * | 10/2023 | Chalmers | H04N 7/147 |
| 11,863,596 B2 * | 1/2024 | Bauer | G06F 3/012 |
| 2011/0041059 A1 | 2/2011 | Amarasingham et al. | |
| 2016/0026253 A1 | 1/2016 | Bradski et al. | |
| 2017/0091980 A1 | 3/2017 | Sebastian et al. | |
| 2018/0130259 A1 | 5/2018 | Leefsma et al. | |
| 2019/0094981 A1 | 3/2019 | Bradski et al. | |
| 2019/0313056 A1 | 10/2019 | Harrison et al. | |
| 2019/0356758 A1 | 11/2019 | Finn et al. | |
| 2020/0059502 A1 * | 2/2020 | Iyer | H04L 65/4053 |
| 2020/0168119 A1 | 5/2020 | Ramani et al. | |
| 2021/0043005 A1 | 2/2021 | Arora et al. | |
| 2021/0201530 A1 | 7/2021 | Cowburn et al. | |
| 2021/0241529 A1 | 8/2021 | Cowburn et al. | |
| 2021/0303075 A1 | 9/2021 | Cowburn et al. | |
| 2021/0306386 A1 | 9/2021 | Smith et al. | |
| 2021/0368136 A1 * | 11/2021 | Chalmers | H04N 7/157 |
| 2023/0179641 A1 | 6/2023 | Bauer et al. | |

FOREIGN PATENT DOCUMENTS

| | | |
|---|---|---|
| CN | 107430858 | 12/2017 |
| KR | 20020039882 | 5/2002 |
| KR | 20100109518 | 10/2010 |
| WO | 2019143572 | 7/2019 |
| WO | WO-2020087176 A1 | 5/2020 |
| WO | 2023107846 | 6/2023 |
| WO | WO-2023107846 A1 | 6/2023 |

OTHER PUBLICATIONS

"U.S. Appl. No. 17/544,496, Notice of Allowance mailed Jun. 2, 2023", 9 pgs.

"U.S. Appl. No. 17/544,496, Response filed Feb. 8, 2023 to Non Final Office Action mailed Nov. 10, 2022", 9 pgs.

"International Application Serial No. PCT/US2022/080702, International Search Report mailed Mar. 16, 2023", 3 pgs.

"International Application Serial No. PCT/US2022/080702, Written Opinion mailed Mar. 16, 2023", 6 pgs.

"U.S. Appl. No. 17/544,496, 312 Amendment filed Sep. 1, 2023", 3 pgs.

"U.S. Appl. No. 17/544,496, PTO Response to Rule 312 Communication mailed Sep. 29, 2023", 2 pgs.

U.S. Appl. No. 17/544,496 U.S. Pat. No. 11,863,596, filed Dec. 7, 2021, Shared Augmented Reality Session Creation.

"Korean Application Serial No. 10-2024-7022634, Notice of Preliminary Rejection mailed Nov. 22, 2024", w/ English translation, 11 pgs.

"Chinese Application Serial No. 202280080744.1, Office Action mailed Nov. 16, 2024", w/ English Translation, 11 pgs.

* cited by examiner

SHARED AUGMENTED REALITY SESSION CREATION

RELATED APPLICATION DATA

This is a continuation of U.S. patent application Ser. No. 17/544,496 filed on Dec. 7, 2021 (now U.S. Pat. No. 11,863,596), the contents of which are incorporated herein by reference as if explicitly set forth.

TECHNICAL FIELD

The present disclosure relates generally to augmented reality and other display devices and interfaces, and to the creation and joining of shared augmented reality or other visual computing sessions.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

A user of the head-worn device may access a messaging or social network application to view or share content with other users of the application. In some cases, live or stored content can be viewed and enhanced or modified by the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
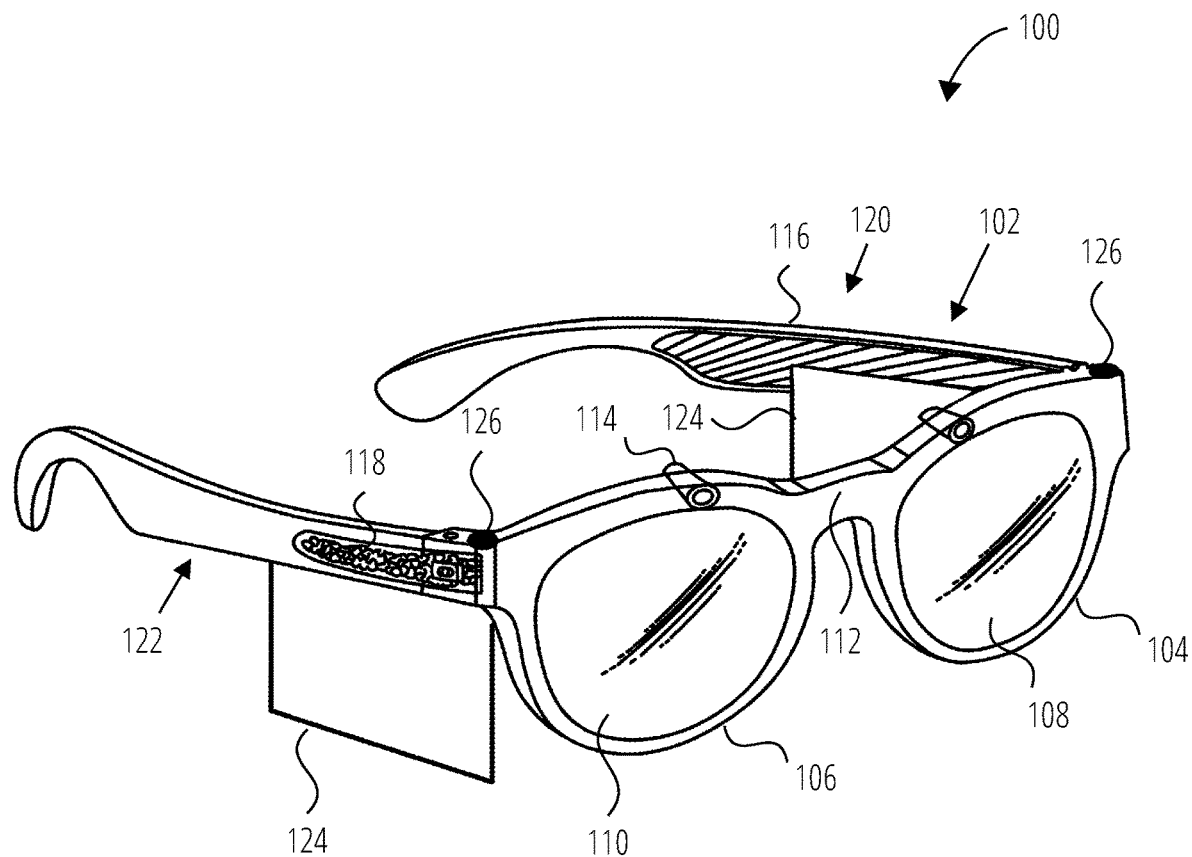
FIG. 1 is a perspective view of a head-worn device, in accordance with some examples.

Known head-worn devices, such as AR spectacles, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used.

AR spectacles can be used to create a shared environment in which a virtual object is positioned in a fixed location in the real world, viewable from the point of view of each of the users who are participating in the shared environment. The participants can then collaborate or compete in the shared environment. In some examples, a shared AR session in which a plurality of users via client devices can participate is hosted on a system that includes multiple head-worn devices, associated mobile devices and networked resources. The experience is synchronized and shared between the users, such that the actions of one user in the shared AR session can be synchronized and broadcast to the other users.

In some situations, it may be beneficial to provide a means whereby users who are physically present or nearby are notified of the existence of a shared AR session already in progress in the vicinity, and to provide them with an option to join the shared AR session already in progress. This can be accomplished by short-range data transmissions from a current participant's head worn device or other computing device, advertising the type and session ID of the shared AR session already in progress.

In some examples, provided is a method of initiating or joining a visual computing session, executed by one or more processers, that includes receiving user input to initiate a session of a visual computing experience, detecting short-range data transmissions includes data indicating existence of a current session of the visual computing experience, determining that a current session of the visual computing experience is in process, based on the data indicating the existence of a current session of the visual computing experience, and based on determining that the current session is in process, providing a user input option to join the current session of the visual computing experience.

The method may further include receiving user input to start a new session of the visual computing experience, and transmitting short-range data transmissions including data indicating the existence of the new session of the visual computing experience. The data indicating the existence of the current session of the visual computing experience may include a session identifier, and the method may further include transmitting a request to a remote server to join the current session, the request including the session identifier.

The user input option to join the current session may be selectively provided based on additional requirements being met. The addition requirements may comprise a degree of relationship between a user from whom the user input to initiate the session is received and other participants in the current session.

The data indicating the existence of the current session or the new session of the visual computing experience may include an identifier corresponding to the visual computing experience and a session identifier.

In some examples, provided is a system that includes one or more cameras, one or more display devices and one or more processors. The system also includes a memory storing instructions that, when executed by the one or more processors, configure the system to perform operations to initiate or join a visual computing session corresponding to the methods disclosed above, including but not limited to receiving user input to initiate a session of a visual computing experience, detecting short-range data transmissions includes data indicating existence of a current session of the visual computing experience, determining that a current session of the visual computing experience is in process, based on the data indicating the existence of a current session of the visual computing experience, and based on determining that the current session is in process, providing a user input option to join the current session of the visual computing experience.

In some examples, provided is a non-transitory computer-readable storage medium including instructions that when executed by a system including one or more display devices, cause the system to perform operations to initiate or join a visual computing session corresponding to the methods disclosed above, including but not limited to receiving user input to initiate a session of a visual computing experience, detecting short-range data transmissions includes data indicating existence of a current session of the visual computing experience, determining that a current session of the visual computing experience is in process, based on the data indicating the existence of a current session of the visual computing experience, and based on determining that the current session is in process, providing a user input option to join the current session of the visual computing experience.

Other technical features may be readily apparent to one skilled in the art from the following figures, descriptions, and claims.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

In some examples, an augmented reality effect includes augmented reality (or "AR") content configured to modify or transform image data presented within a GUI of the head-worn device in some way. For example, complex additions or transformations to the content images may be performed using AR effect data, such as adding rabbit ears to the head of a person, adding floating hearts with background coloring, altering the proportions of a person's features, adding enhancements to landmarks in a scene being viewed on a head-worn device or many numerous other such transformations. This includes both real-time modifications that modify an image as it is captured using a camera associated with the head-worn device, which is then displayed by the head-worn device with the AR effect modifications, as well as modifications to stored content, such as video clips in a gallery that may be modified using AR effects. Similarly, real-time video capture may be used with an AR effect to show to a user of a head-worn device how video images currently being captured by sensors of a device would modify the captured data. Such data may simply be displayed on the screen and not stored in memory, the content captured by the device sensors may be recorded and stored in memory with or without the AR effect modifications (or both), or the content captured by the device sensors may be transmitted, with the AR effect modification, over a network to a server or another device.

AR effects and associated systems and modules for modifying content using AR effects may thus involve detection of objects (e.g., faces, hands, bodies, cats, dogs, surfaces, objects), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information needed to achieve such transformations with object detection, tracking, and placement.

While described herein with reference to AR systems, the concepts and methods disclosed herein also apply to other joint visual computing experiences, such as virtual reality or metaverse sessions.

FIG. 1 is perspective view of a head-worn device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples the frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple piece 120 or the temple piece 122. The computer 118 can include one or more processors with memory, wireless communication circuitry, and a power source. As discussed below, the computer 118 comprises low-power circuitry, high-speed circuitry, and a display processor. Various other examples may include these elements in different configurations or integrated together in different ways. Additional details of aspects of computer 118 may be implemented as illustrated by the data processor 302 discussed below.

The computer 118 additionally includes a battery 116 or other suitable portable power supply. In some examples, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, other examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include a touchpad 124 mounted to or integrated with one or both of the left temple piece 120 and right temple piece 122. The touchpad 124 is generally vertically-arranged, approximately parallel to a user's temple in some examples. As used herein, generally vertically aligned means that the touchpad is at least more vertical than horizontal, although potentially more vertical than that. Additional user input may be provided by one or more buttons 126, which in the illustrated examples are provided on the outer upper edges of the left optical element holder 104 and right optical element holder 106. The one or more touchpads 124 and buttons 126 provide a means whereby the glasses 100 can receive input from a user of the glasses 100.

Figure 2:
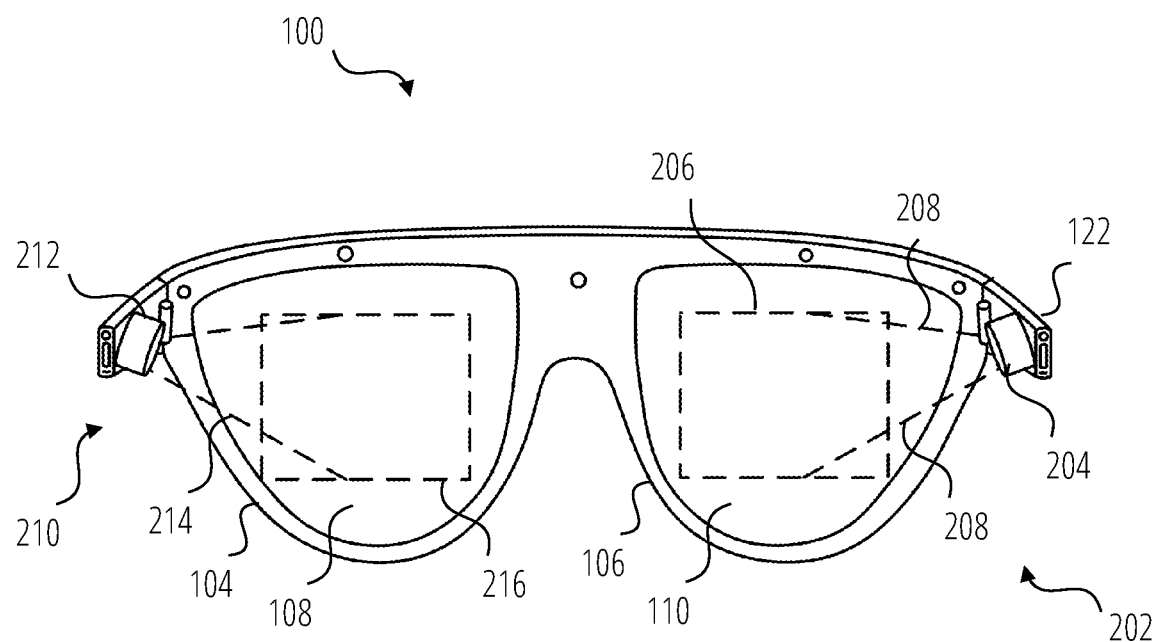
FIG. 2 illustrates a further view of the head-worn device of FIG. 1, in accordance with some examples.

FIG. 2 illustrates the glasses 100 from the perspective of a wearer. For clarity, a number of the elements shown in FIG. 1 have been omitted. As described in FIG. 1, the glasses 100 shown in FIG. 2 include left optical element 108 and right optical element 110 secured within each of the left optical element holder 104 and the right optical element holder 106, respectively.

The glasses 100 include forward optical assembly 202 comprising a right projector 204 and a right near eye display 206, and a forward optical assembly 210 comprising a left projector 212 and a near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user.

It will be appreciated however that other display technologies or configurations may be provided that can display an image to a user in a forward field of view. For example, instead of a projector 204 and a waveguide, an LCD, LED or other display panel or surface may be provided instead.

In use, a wearer of the glasses 100 will be presented with information, content and various user interfaces on the near eye displays. As described in more detail below, the user can then interact with the glasses 100 using a touchpad 124 and/or the buttons 126, in addition to providing voice inputs or touch inputs on an associated device, for example client device 328 illustrated in FIG. 3.

Figure 3:
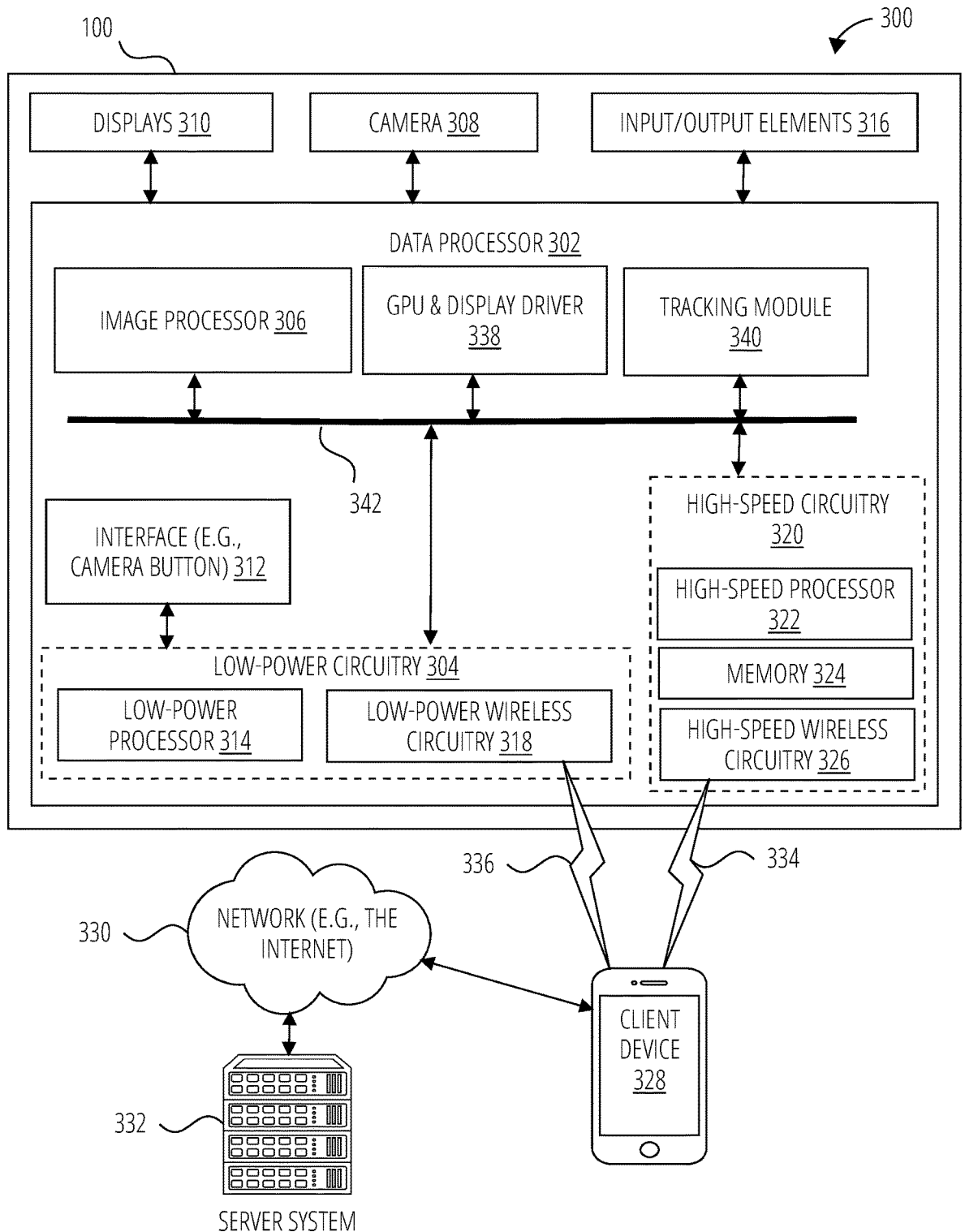
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples.

The networked system 300 includes the glasses 100, a client device 328, and a server system 332. The client device 328 may be a smartphone, tablet, phablet, laptop computer, access point, or any other such device capable of connecting with the glasses 100 using both a low-power wireless connection 336 and a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 804 or the machine 900 described in FIG. 8 and FIG. 9.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 8 and FIG. 9. For example, the input/output elements 316 may include any of I/O components 906 including output components 928, motion components 936, and so forth. Examples of the displays 310 are discussed in FIG. 2. In the particular examples described herein, the displays 310 include a display for each one of a user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the camera 308. In other examples, the interface 312 may have a software component, or may be associated with a command received wirelessly from another source, such as from the client device 328.

The image processor 306 includes circuitry to receive signals from the camera 308 and process those signals from the camera 308 into a format suitable for storage in the memory 324 or for transmission to the client device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 812 of FIG. 8. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in other examples, the memory 324 may be an independent stand-alone element of the data processor 302. In certain such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is needed.

The tracking module 340 estimates a pose of the glasses 100. For example, the tracking module 340 uses image data and corresponding inertial data from the camera 308 and the position components 940, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the client device 328, or on a remote server. For example, one or more functions or operations described herein may be performed by one of the applications 806 such as messaging application 846.

Figure 4:
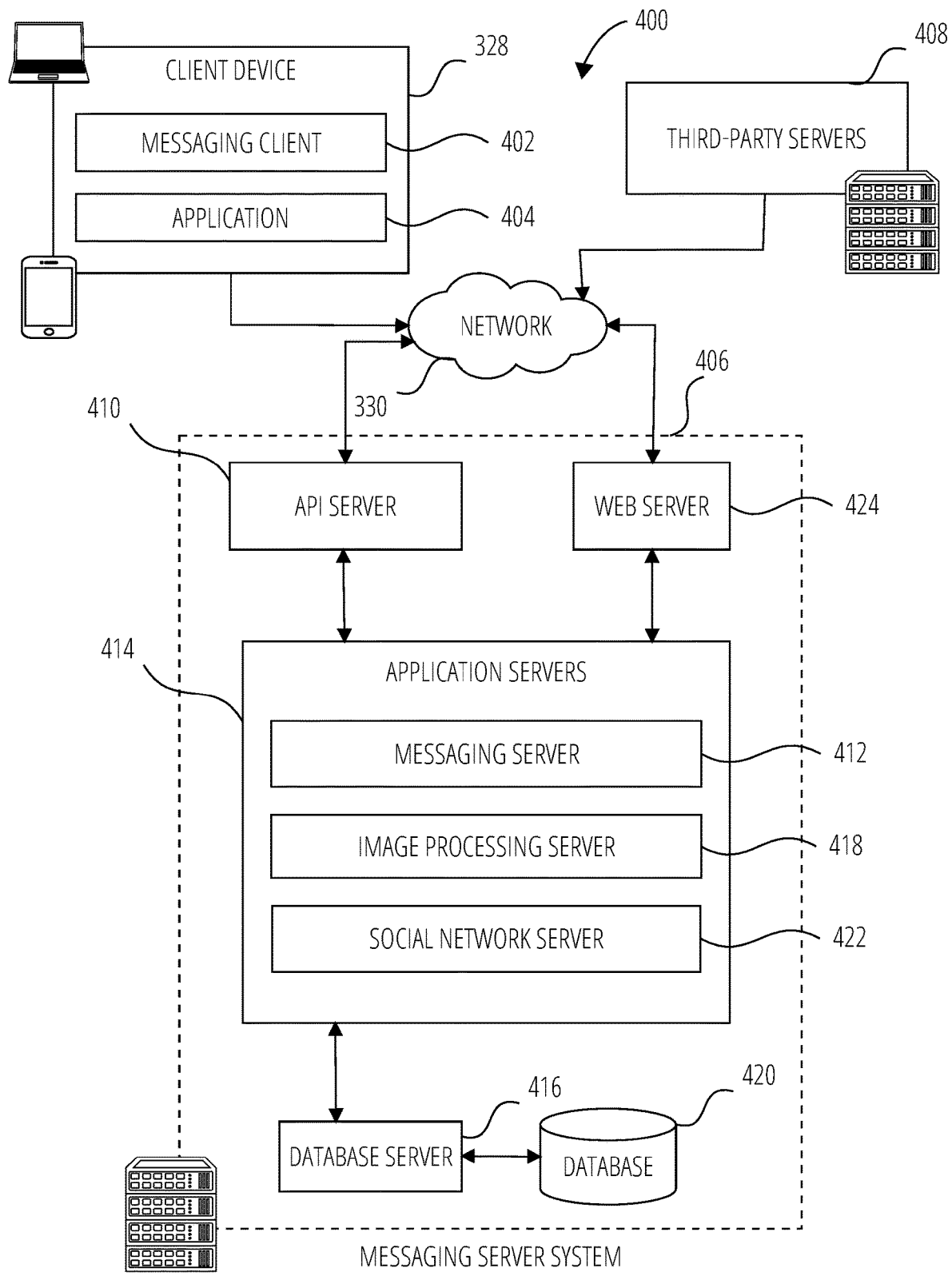
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 328, each of which hosts a number of applications, including a messaging client 402 and other applications 404. Each messaging client 402 is communicatively coupled to other instances of the messaging client 402 (e.g., hosted on respective other client devices 328), a messaging server system 406 and third-party servers 408 via a network 330 (e.g., the Internet). A messaging client 402 can also communicate with locally-hosted applications 404 using Applications Program Interfaces (APIs).

A messaging client 402 is able to communicate and exchange data with other messaging clients 402 and with the messaging server system 406 via the network 330. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 330 to a particular messaging client 402. While certain functions of the messaging system 400 are described herein as being performed by either a messaging client 402 or by the messaging server system 406, the location of certain functionality either within the messaging client 402 or the messaging server system 406 may be a design choice. For example, it may be technically preferable to initially deploy certain technology and functionality within the messaging server system 406 but to later migrate this technology and functionality to the messaging client 402 where a client device 328 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 410 is coupled to, and provides a programmatic interface to, application servers 414. The application servers 414 are communicatively coupled to a database server 416, which facilitates access to a database 420 that stores data associated with messages processed by the application servers 414. Similarly, a web server 424 is coupled to the application servers 414, and provides web-based interfaces to the application servers 414. To this end, the web server 424 processes incoming network requests over the Hypertext Transfer Protocol (HTTP) and several other related protocols.

The Application Program Interface (API) server 410 receives and transmits message data (e.g., commands and message payloads) between the client device 328 and the application servers 414. Specifically, the Application Program Interface (API) server 410 provides a set of interfaces (e.g., routines and protocols) that can be called or queried by the messaging client 402 in order to invoke functionality of the application servers 414. The Application Program Interface (API) server 410 exposes various functions supported by the application servers 414, including account registration, login functionality, the sending of messages, via the application servers 414, from a particular messaging client 402 to another messaging client 402, the sending of media files (e.g., images or video) from a messaging client 402 to a messaging server 412, and for possible access by another messaging client 402, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 414 host a number of server applications and subsystems, including for example a messaging server 412, an image processing server 418, and a social network server 422. The messaging server 412 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory intensive processing of data may also be performed server-side by the messaging server 412, in view of the hardware requirements for such processing.

The application servers 414 also include an image processing server 418 that is dedicated to performing various image processing operations, typically with respect to images or video within the payload of a message sent from or received at the messaging server 412.

The social network server 422 supports various social networking functions and services and makes these functions and services available to the messaging server 412. To this end, the social network server 422 maintains and accesses an entity graph within the database 420. Examples of functions and services supported by the social network server 422 include the identification of other users of the messaging system 400 with which a particular user has relationships or is "following," and also the identification of other entities and interests of a particular user.

The messaging client 402 can notify a user of the client device 328, or other users related to such a user (e.g., "friends"), of activity taking place in shared or shareable sessions. For example, the messaging client 402 can provide participants in a conversation (e.g., a chat session) in the messaging client 402 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 5A:
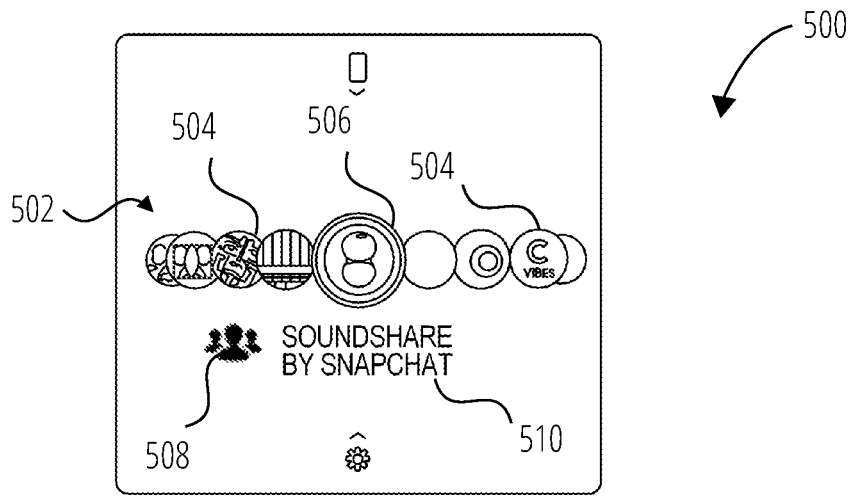
FIG. 5A illustrates an aspect of the subject matter in accordance with one embodiment.

FIG. 5A illustrates a user interface 500 that is displayed to a user of the glasses 100 according to some examples. The user interface 500 includes a carousel 502 of icons 504 that correspond to augmented reality experiences that are available for selection by a user. The carousel 502 can be scrolled left or right to move one of the icons 504 into a central position, in which the augmented reality experience corresponding to that icon can be activated, for example by a tap input on one of the touchpads 124. Scrolling of the carousel 502 can for example be achieved by forward or backward swiping on one of the touchpads 124.

In the illustrated user interface 500, a selected icon 506 in the central position in the carousel 502 has its title 510 displayed underneath the carousel to identify the corresponding augmented reality experience. The fact that the selected augmented reality experience can be provided in a shared session with other users is identified by a display element 508 such as a symbol showing the heads and shoulders of more than one person. Activating an augmented reality experience that can be provided in a shared session will transition the user interface to either that shown in FIG. 5B or in FIG. 5C depending on whether or not an existing shared session is happening nearby as determined by the detection of short-range advertising as discussed below.

Figure 5B:
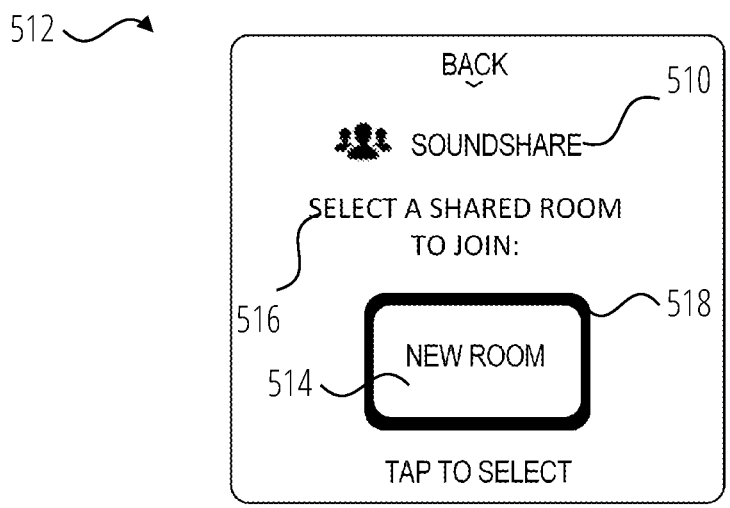
FIG. 5B illustrates an aspect of the subject matter in accordance with one embodiment.

FIG. 5B illustrates a user interface 512 that is displayed to a user of the glasses 100 when a shared-session augmented reality experience is selected by the user but there is no nearby instance of a shared session of the same augmented reality experience. The title 510 of the augmented reality experience is displayed, followed by a "Select a shared room to join" prompt 516. Underneath the prompt 516 is only one option, a new room selection option 514. A visual enhancement 518 such as highlighting or a surrounding bracket may be provided to indicate that this option will be selected upon receiving user input, such as a tap on one of the touchpads 124.

FIG. 5B illustrates a user interface 520 that is displayed to a user of the glasses 100 when a shared-session augmented reality experience is selected by the user and there is nearby instance of a shared session of the same augmented reality experience. The title 510 of the augmented reality experience is displayed, followed by a "Select a shared room to join" prompt 516. Underneath the prompt 516 is a new room selection option 514 as before, as well as one or more additional options corresponding to shared sessions of the same augmented reality experience that are in the vicinity. In the illustrated example, an existing session selection option 522 to join a shared session initiated by user Terek is available for selection. A visual enhancement 518 such as highlighting or a surrounding bracket may be provided to indicate which option will be selected upon receiving user input, such as a tap on one of the touchpads 124. A user can scroll between the available options for example by forward or backward swiping on one of the touchpads 124.

Figure 6:
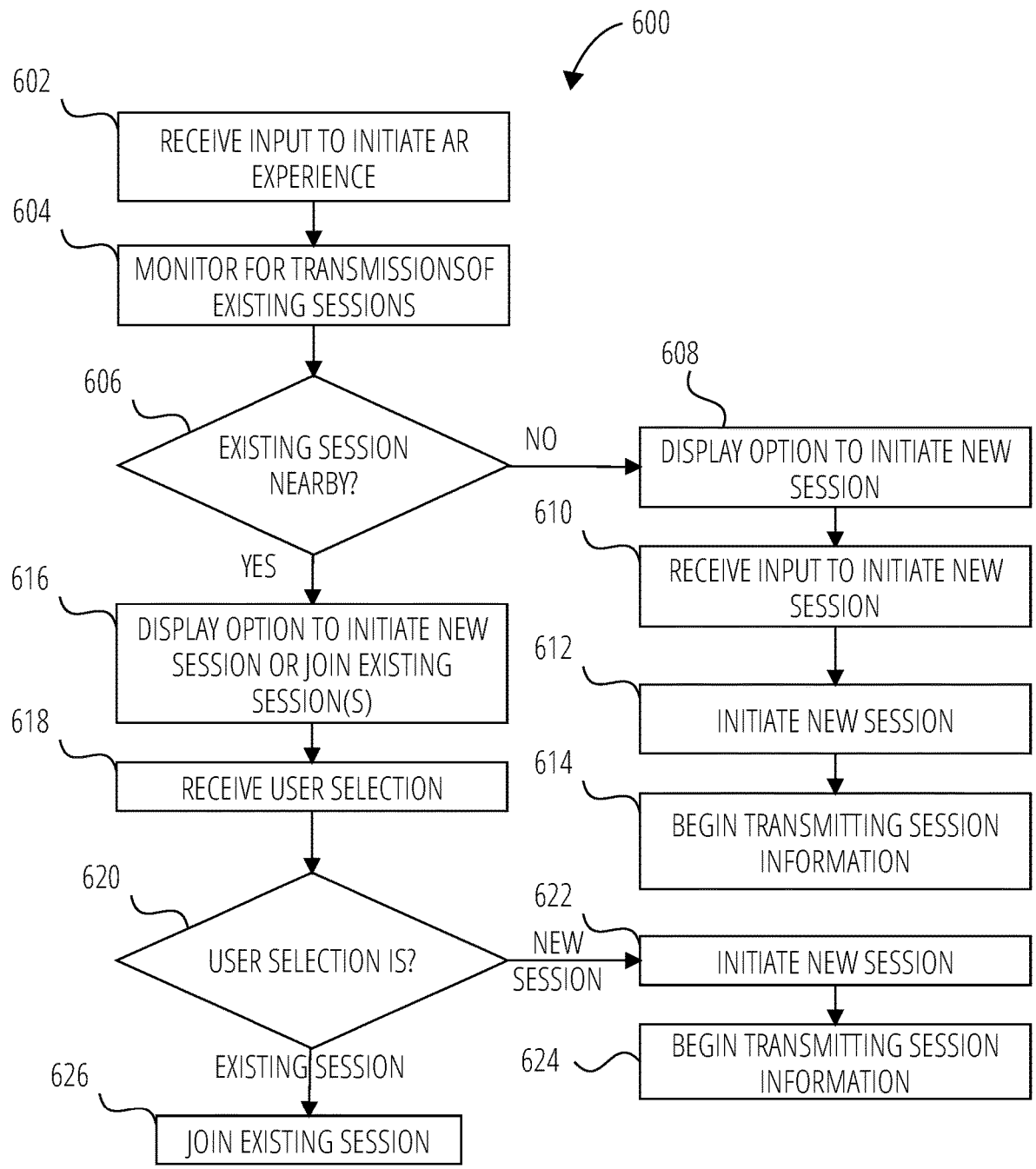
FIG. 6 is a flowchart illustrating operations performed by a head-worn device system for shared AR session creation according to some examples.

FIG. 6 is a flowchart 600 illustrating operations performed by glasses 100 to provide or facilitate a shared augmented reality session according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations.

The operations illustrated in FIG. 6 will typically execute on the data processor 302 and associated hardware in or associated with the glasses 100. For the purposes of clarity, flowchart 600 is discussed herein with reference to such an example. Various implementations are of course possible, with some of the operations taking place in client device 328 in an application such as messaging application 846, on server system 332, or with one application on the client device 328 calling another application or SDK for required functionality. In some examples, the operations are performed jointly between messaging application 846 running on the client device 328 and the data processor 302 and associated hardware in or associated with the glasses 100.

The method starts at operation 602 with receipt of user input requesting initiation by the respective glasses 100 or client device 328 of an augmented reality experience that permits multiple participants, for example as discussed with reference to FIG. 5A. In operation 604, the glasses or client device 328 begin monitoring for transmissions of existing sessions of the same AR experience that are taking place in the vicinity. This is done by the glasses 100 or the client device 328 monitoring for short-range transmissions that include relevant identifying information, such as an identifier of the AR experience and a session identifier. Any potentially-relevant identifying information is extracted from any detected short-range transmissions. The short-range transmission may be Bluetooth or Bluetooth LE broadcasts or beacons, but any other suitable short-range data transmission method (IR, ultrasound, RF etc.) may be employed. The range of the data transmission method and protocol should be sufficient to cover a reasonable area around the glasses 100 or client device 328 within which potential participants are likely to be located—either physically present or who can reasonably quickly become physically present.

In operation 606, the glasses 100 or client device 328 determines whether or not an existing shared session exists based on the presence or absence of short-range transmissions identifying existing sessions of the same AR experience. The presence of an existing session is determined by verifying that the identifying information in any received and potentially-relevant short-range transmission is the same as the identifying information for the AR experience for which user input has been received in operation 602. The lack of an existing session is determined if no potentially-relevant short-range transmissions are received, or the identifying information in any received short-range transmission does not match the identifying information for the AR experience for which user input has been received in operation 602.

If no existing sessions are nearby, the method proceeds to operation 608 where an option is displayed to initiate a new shared session, for example as shown in FIG. 5B. Upon receipt of input to initiate a new session in operation 610, a new session of the AR experience is initiated in operation 612.

The glasses 100 or client device 328 then begin transmitting short-range transmissions that include relevant identifying information, such as an identifier of the AR experience and a session identifier of the new session, in operation 614. These transmissions continue until the user exits the shared session.

Creation and management of the actual session itself occurs in the application servers 414, and includes allocating a unique ID for the shared session that is provided to the client device 328 that originates the new session. Communication between the participants' client devices 328 also primarily occurs over the network 330, with or without the application servers 414 acting as intermediaries. The broadcast of identifying information using short-range transmissions thus provides out-of-band session initiation that exploits the short-range nature of the transmissions to identify the existence of a shared session that can be joined by potential participants who are nearby.

Figure 5C:
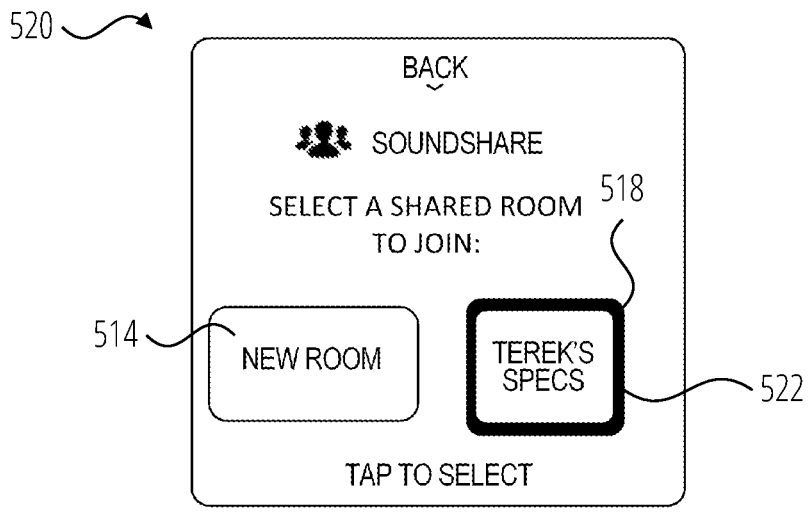
FIG. 5C illustrates an aspect of the subject matter in accordance with one embodiment.

If it is determined in operation 606 that an existing session is occurring nearby, the method proceeds to operation 616 where an option is displayed to initiate a new shared session or join one or more existing session, for example as shown in FIG. 5C. As determined in operation 620, upon receipt of input to initiate a new session in operation 618, a new session of the AR experience is initiated in operation 622. The glasses 100 or client device 328 then begin transmitting short-range transmissions that include relevant identifying information, such as an identifier of the AR experience and a session identifier of the new session, in operation 624. These transmissions continue until the user exits the new session.

As determined in operation 620, upon receipt of input to join an existing session in operation 618, the selected existing session is joined in operation 626.

In some examples, the name of the creator of a shared session and other potentially-relevant information such as permissions or limitations regarding the joint session, is included in the short-range transmissions. In other examples, upon receipt of the session identifier, additional information can be retrieved from the messaging server system 406. This information might include the name of the creator of the shared session as well as permissions or requirements.

For example, the additional information might specify that a certain degree of relationship be present between the creator or other participants in the joint session and the user of the client device 328 in order for the option to join the existing session to be provided to the user of the client device 328. For example, the degree of relationship might specify that only friends of the creator of the shared session, or friends of the creator (or other current participant) and friends of friends. In another example, certain hardware levels may be required to join the session. In the event that there are any limitations on who or what can join the shared session, this information is extracted from the short-range transmissions or retrieved from the messaging server system 406 using the session identifier, and any restrictions or limitations are checked as part of operation 606 to ensure that only sessions that can be joined are displayed in operation 616.

Figure 7:
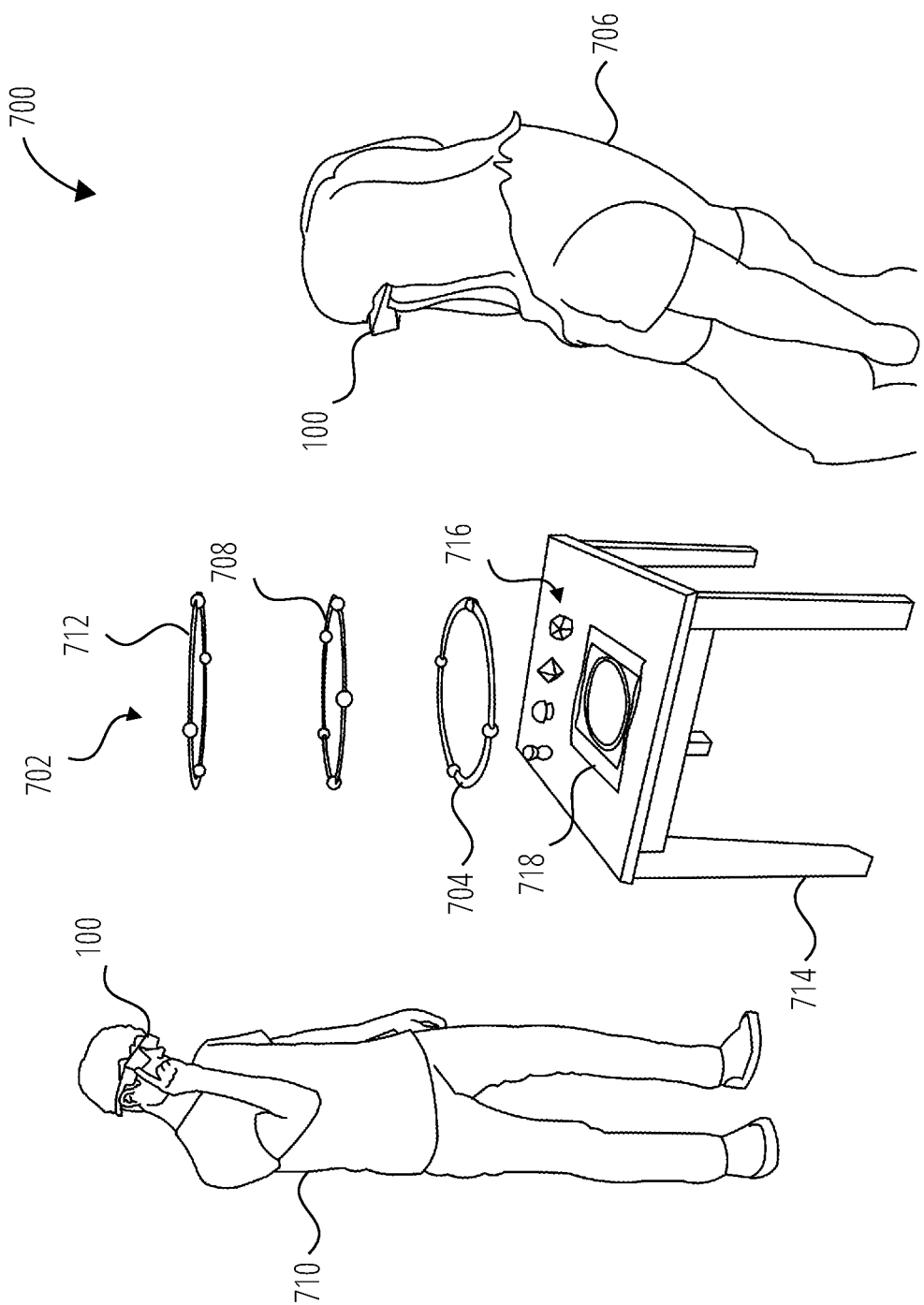
FIG. 7 illustrates a collaborative AR session as viewed by a participant wearing a head-worn device, in accordance with some examples.

FIG. 7 illustrates a shared session 700 as seen by a first participant wearing a head-worn device such as glasses 100. The shared session 700 has been initiated and joined as discussed above. FIG. 7 includes items in the real world that are seen by the first participant, including a second participant 706, a third participant 710, a table 714 and a registration marker 718. Overlaid over the real world elements on the displays 310 of the first participant's glasses 100 are shared AR objects 702, including bottom AR loop 704, middle AR loop 708, top AR loop 712 and AR interface 716.

Each participant has a view of the shared AR objects 702 that is dependent on the position of their respective glasses 100. Compared to the shared session 700 viewed by the first participant as illustrated, the second participant 706 is looking at the right-hand side of the shared AR objects 702 while the third participant 710 is looking at the left-hand side of the shared AR objects 702. Were the first participant to move to the location of the third participant 710, the shared AR objects 702 would rotate in the first participant's field of view so as to appear as fixed relative to the table 714 as if the shared AR objects 702 were a real and not a virtual object. Depending on the implementation, the participants are each able to manipulate the shared AR objects 702 with various ends in mind, such as music creation, game playing or other collaborative or participatory AR activities.

Creation of this shared frame of reference can be accomplished in a number of ways. In some examples, a registration marker (such as registration marker 718) is placed in a relevant location, such as where the shared AR objects 702 is to be used (on top of the table 714 in FIG. 7). One of the glasses 100 (e.g., that of the creator of the shared session) captures an image of the registration marker, which is transmitted to the glasses that are being worn by the other participants. The other glasses also each detect and capture an image of the registration marker. The other glasses 100 then each determine a transformation between the first image and the images that each of the glasses 100. A common coordinate frame is then determined using the transformation, and the shared session 700 is generated using the common coordinate frame. The registration marker remains visible to each of the glasses 100, and can be used as a reference to update the pose of each of the glasses 100 as the participants move around in the environment. The view of the shared AR objects 702 is then updated to reflect each new pose of the glasses 100.

Other methods may be used to generate the shared frame of reference and, including for example 3D reconstruction and visual inertial odometry based on images captured by each pair of glasses 100 and based on signals or data received from inertial or other positional sensors located in each pair of glasses. Features identified using 3D reconstruction may also be compared with an existing point cloud model to locate and determine the pose of each pair of glasses in the real-world environment.

Figure 8:
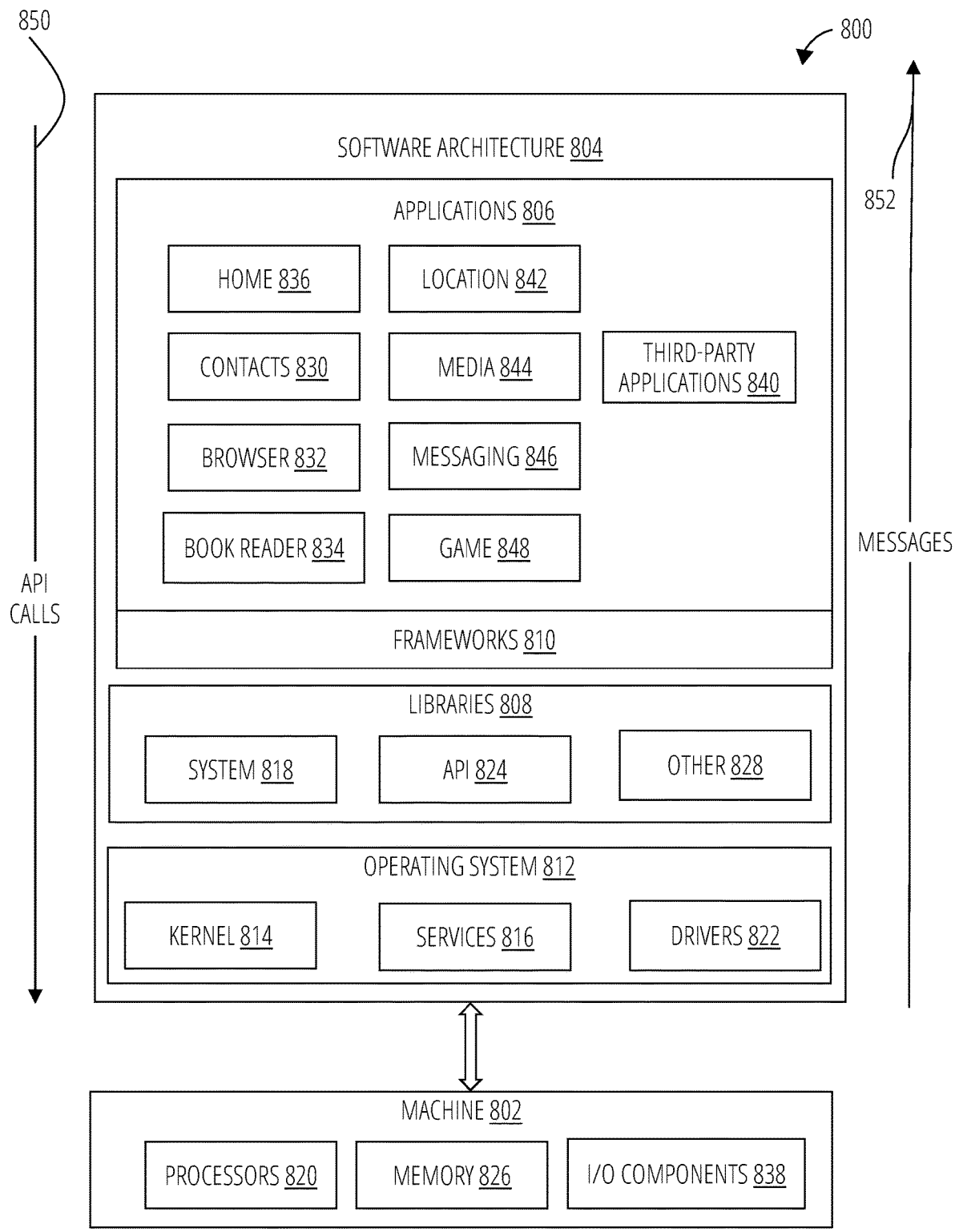
FIG. 8 is a block diagram showing a software architecture within which the present disclosure may be implemented, in accordance with some examples.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

Figure 9:
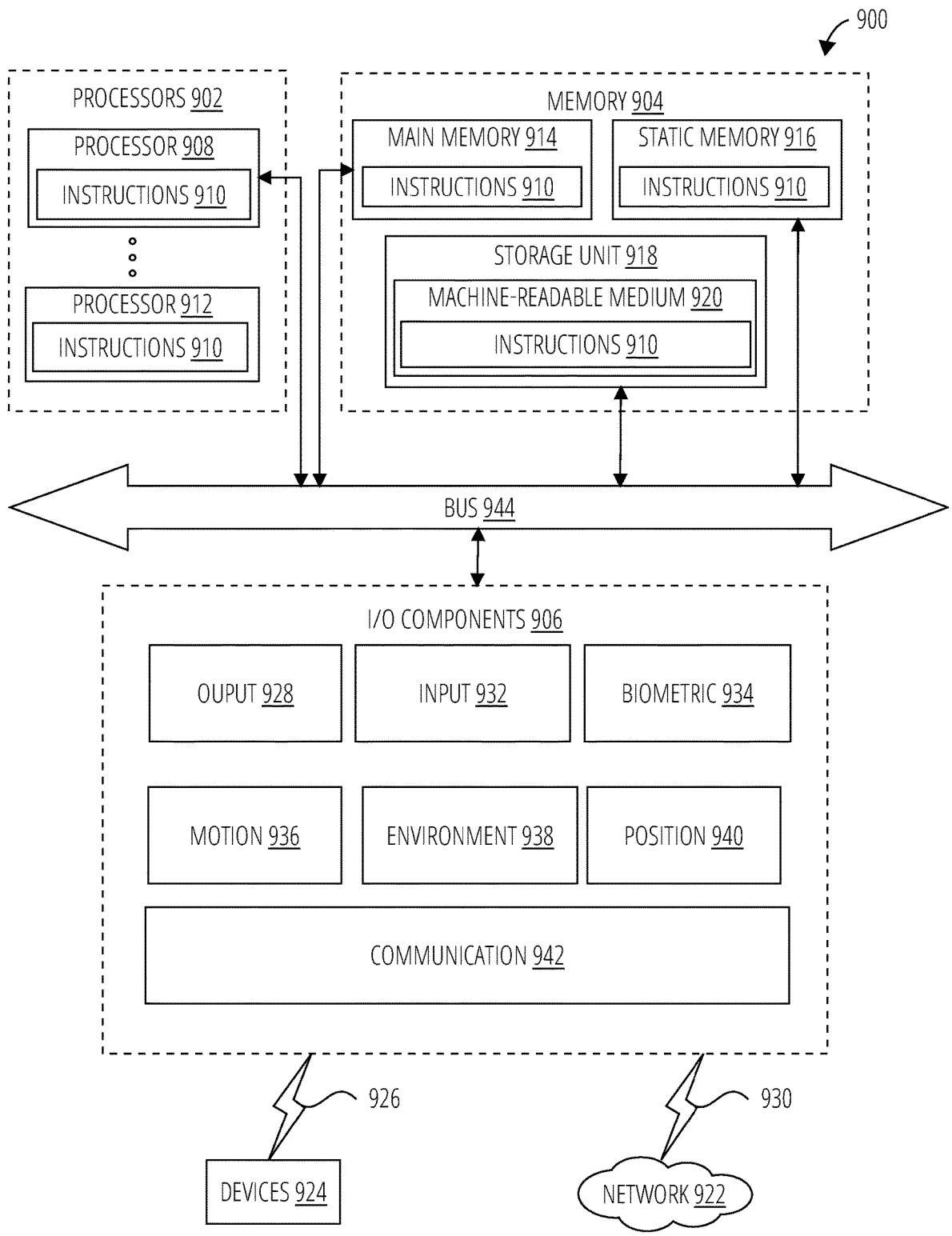
FIG. 9 is a diagrammatic representation of a machine, in the form of a computer system within which a set of instructions may be executed for causing the machine to perform any one or more of the methodologies discussed, in accordance with some examples.

FIG. 9 is a diagrammatic representation of a machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 902, memory 904, and I/O components 906, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 914, a static memory 916, and a storage unit 918, both accessible to the processors 902 via the bus 944. The main memory 904, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 902 (e.g., within the processor's cache memory), or any suitable combination thereof, during execution thereof by the networked system 300.

The I/O components 906 may include a wide variety of components to receive input, provide output, produce output, transmit information, exchange information, capture measurements, and so on. The specific I/O components 906 that are included in a particular machine will depend on the type of machine. For example, portable machines such as mobile phones may include a touch input device or other such input mechanisms, while a headless server machine will likely not include such a touch input device. It will be appreciated that the I/O components 906 may include many other components that are not shown in FIG. 9. In various examples, the I/O components 906 may include output components 928 and input components 932. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 932 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 906 may include biometric components 934, motion components 936, environmental components 938, or position components 940, among a wide array of other components. For example, the biometric components 934 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 936 include acceleration sensor components (e.g., accelerometer), gravitation sensor components, rotation sensor components (e.g., gyroscope), and so forth. The environmental components 938 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 940 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 906 further include communication components 942 operable to couple the networked system 300 to a network 922 or devices 924 via a coupling 930 and a coupling 926, respectively. For example, the communication components 942 may include a network interface component or another suitable device to interface with the network 922. In further examples, the communication components 942 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 924 may be another machine or any of a wide variety of peripheral devices (e.g., a peripheral device coupled via a USB).

Moreover, the communication components 942 may detect identifiers or include components operable to detect identifiers. For example, the communication components 942 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 942, such as location via Internet Protocol (IP) geolocation, location via Wi-Fi® signal triangulation, location via detecting an NFC beacon signal that may indicate a particular location, and so forth.

The various memories (e.g., memory 904, main memory 914, static memory 916, and/or memory of the processors 902) and/or storage unit 918 may store one or more sets of instructions and data structures (e.g., software) embodying or used by any one or more of the methodologies or functions described herein. These instructions (e.g., the instructions 910), when executed by processors 902, cause various operations to implement the disclosed examples.

The instructions 910 may be transmitted or received over the network 922, using a transmission medium, via a network interface device (e.g., a network interface component included in the communication components 942) and using any one of a number of well-known transfer protocols (e.g., hypertext transfer protocol (HTTP)). Similarly, the instructions 910 may be transmitted or received using a transmission medium via the coupling 926 (e.g., a peer-to-peer coupling) to the devices 924.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method of initiating or joining a visual computing session on a first device, executed by one or more processors, comprising:
   receiving user input on the first device to initiate a new session of a visual computing experience;
   determining that a current session of the visual computing experience is in progress on a second, physically-present device; and
   based on determining that the current session is in progress on the second, physically-present device, providing a user input option to join the current session of the visual computing experience using the first device instead of starting the new session of the visual computing experience.

2. The method of claim 1, further comprising:
   receiving further user input on the first device to start a new session of the visual computing experience; and
   transmitting short-range data transmissions from the first device including data indicating that the new session of the visual computing experience is in progress on the first device.

3. The method of claim 2, wherein the data indicating that the new session or current session of the visual computing experience is in progress comprises an identifier corresponding to the visual computing experience.

4. The method of claim 3, wherein the data indicating that the new session or current session of the visual computing experience is in progress further comprises a session identifier.

5. The method of claim 1, wherein the determining that the current session of the visual computing experience is in progress on the second, physically-present device comprises receiving data from the second, physically-present device indicating that the current session of the visual computing experience is in progress, the data including a session identifier, the method further comprising:
   transmitting a request from the first device to a remote server to join the current session, the request including the session identifier.

6. The method of claim 1, further comprising:
   selectively providing the user input option to join the current session based on additional requirements being met, wherein the additional requirements comprise a degree of relationship between a user of the first device from whom the user input to initiate the session is received and other participants in the current session of the visual computing experience.

7. The method of claim 1, wherein determining that the current session of the visual computing experience is in progress on the second, physically-present device comprises detecting short-range data transmissions from the second, physically-present device comprising data indicating that the current session of the visual computing experience is in progress on the second, physically-present device.

8. A system, comprising:
   a computing device comprising one or more cameras and one or more display devices;
   one or more processors; and
   a memory storing instructions that, when executed by the one or more processors, configure the system to perform operations to initiate or join a visual computing session, comprising:
   receiving user input on the computing device to initiate a new session of a visual computing experience;
   determining that a current session of the visual computing experience is in progress on another, physically-present device; and
   based on determining that the current session is in progress on the other, physically-present device, providing a user input option to join the current session of the visual computing experience using the computing device instead of starting the new session of the visual computing experience.

9. The system of claim 8, wherein the operations further comprise:
   receiving further user input to start a new session of the visual computing experience on the computing device; and
   transmitting short-range data transmissions from the computing device including data indicating that the new session of the visual computing experience is in progress on the computing device instead of starting the new session of the visual computing experience.

10. The system of claim 9, wherein the data indicating that the new session or current session of the visual computing experience is in progress comprises an identifier corresponding to the visual computing experience.

11. The system of claim 9, wherein the data indicating that the new session or current session of the visual computing experience is in progress further comprises a session identifier.

12. The system of claim 8, wherein the determining that the current session of the visual computing experience is in progress on the other, physically-present device comprises receiving data from the other, physically-present device indicating that the current session of the visual computing experience is in progress, the data including a session identifier, the operations further comprising:
   transmitting a request from the computing device to a remote server to join the current session, the request including the session identifier.

13. The system of claim 8, wherein the operations further comprise:
   selectively providing the user input option to join the current session based on additional requirements being met, wherein the additional requirements comprise a degree of relationship between a user of the computing device from whom the user input to initiate the session is received and other participants in the current session of the visual computing experience.

14. The system of claim 13, wherein determining that the current session of the visual computing experience is in progress on the other, physically-present device comprises detecting short-range data transmissions from the other, physically-present device comprising data indicating that the current session of the visual computing experience is in progress on the other, physically-present device.

15. A non-transitory computer-readable storage medium including instructions that when executed by a system including a computing device comprising one or more display devices, cause the system to perform operations to initiate or join a visual computing session, comprising:
receiving user input on the computing device to initiate a new session of a visual computing experience;
determining that a current session of the visual computing experience is in progress on another, physically-present device; and
based on determining that the current session is in progress on the other, physically-present device, providing a user input option to join the current session of the visual computing experience using the computing device instead of starting the new session of the visual computing experience.

16. The non-transitory computer-readable storage medium of claim 15, wherein the operations further comprise:
receiving further user input on the computing device to start a new session of the visual computing experience; and
transmitting short-range data transmissions from the computing device including data indicating that the new session of the visual computing experience is in progress on the computing device.

17. The non-transitory computer-readable storage medium of claim 16, wherein the data indicating that the new session or current session of the visual computing experience is in progress comprises an identifier corresponding to the visual computing experience.

18. The non-transitory computer-readable storage medium of claim 15, wherein the determining that the current session of the visual computing experience is in progress on the other, physically-present device comprises receiving data from the other, physically-present device indicating that the current session of the visual computing experience is in progress, the data including a session identifier, the operations further comprising:
transmitting a request from the computing device to a remote server to join the current session, the request including the session identifier.

19. The non-transitory computer-readable storage medium of claim 15, wherein the operations further comprise:
selectively providing the user input option to join the current session based on additional requirements being met, wherein the additional requirements comprise a degree of relationship between a user of the computing device from whom the user input to initiate the session is received and other participants in the current session of the visual computing experience.

20. The non-transitory computer-readable storage medium of claim 15, wherein determining that the current session of the visual computing experience is in progress on the other, physically-present device comprises detecting short-range data transmissions from the other, physically-present device comprising data indicating that the current session of the visual computing experience is in progress on the other, physically-present device.

* * * * *